United States Patent [19]
Brainard

[11] Patent Number: 5,476,239
[45] Date of Patent: Dec. 19, 1995

[54] GYRO PLATFORM ASSEMBLY WITH A SPINNING VEHICLE

[75] Inventor: Robert E. Brainard, Reno, Nev.

[73] Assignee: The United States of America as represented by the Secretary of the Navy, Washington, D.C.

[21] Appl. No.: 230,463

[22] Filed: Apr. 19, 1994

[51] Int. Cl.[6] .............................. B64G 1/36; B64G 1/38
[52] U.S. Cl. ........................................... 244/171; 244/165
[58] Field of Search .................................... 244/164, 165, 244/171, 170; 73/505, 504

[56] References Cited

U.S. PATENT DOCUMENTS

| | | | |
|---|---|---|---|
| 3,338,116 | 8/1967 | Litman et al. | 244/3.2 |
| 3,365,148 | 1/1968 | Preston et al. | 244/3.2 |
| 3,398,586 | 8/1968 | Griffin et al. | 74/5.34 |
| 3,509,765 | 5/1970 | Stevenson et al. | 74/5.34 |
| 4,136,844 | 1/1979 | Maudal | 244/3.2 |
| 4,275,605 | 6/1981 | Kennel | 74/5.34 |

Primary Examiner—Galen L. Barefoot
Attorney, Agent, or Firm—John P. Tarlano; Darrell E. Hollis

[57] ABSTRACT

A gyro platform assembly for determining the coning rate of a spinning and coning vehicle. A rotatable gimbal is attached to the vehicle such that the axis of rotation of the gimbal is in line with a spin axis of the vehicle. A rotatable platform, that supports three gyros, is attached to the gimbal. An axis of rotation of the platform is perpendicular to the axis of rotation of the gimbal. Each gyro has a rotation sensing axis, the sensing axes being mutually orthogonal, one such sensing axis being placed in line with the spin axis of the vehicle. A sensing axis, that is orthogonal to the spin axis of the vehicle, senses a coning rate of the vehicle. The output of the sensing axis is processed by a computer. The computer outputs a value equal to a sine of the coning rate of the vehicle.

6 Claims, 2 Drawing Sheets

GYRO PLATFORM ASSEMBLY WITH A SPINNING VEHICLE

FIELD OF THE INVENTION

The present invention relates to a gyro platform assembly for a spinning vehicle, the gyro platform assembly being useful for detecting gyro drift rates in the gyro platform assembly.

BACKGROUND OF THE INVENTION

The present invention is a gyro platform assembly that is on a spinning vehicle, such as a spinning space vehicle. The vehicle holds the gyro platform assembly. The assembly has a frame. The frame holds a torquer motor and resolver. The torquer motor and resolver hold a gimbal. The gimbal rotatably holds a platform. The rotation axis of the gimbal is made to be aligned along the spin axis of the spinning vehicle. The rotational axis of the platform is perpendicular to the rotational axis of the gimbal.

The assembly has three rate gyros. The three rate gyros are on the platform. The three rate gyros have mutually orthogonal input axes.

The gimbal can be maintained in a chosen, space-fixed, orientation by counter-rotating the gimbal within the spinning vehicle and with respect to the angular direction of spin of the spinning vehicle. The gimbal is counter-rotated at an angular rate that is equal in magnitude to the angular rate of the spinning vehicle. The gimbal can be rotated by means of a torquer. The counter-rotational angular direction of the gimbal can be made to be opposite to the angular direction of spin of the vehicle.

A drift rate of a sensing axis of each rate gyro can be determined when there is no coning and the gimbal is counter-rotated within the spinning vehicle. The drift rate of each of the three sensing axis is equal to the output of that sensing axis. This is the case when the coning angle of the vehicle is zero.

If there is coning and counter-rotation is applied to the gimbal, the platform can be slowly carrouseled. By comparing differential position measurements, from opposite 180 degree orientations, for gyro input axes that are perpendicular to the carrousel axes, gyro bias in these input axes can be observed and significantly eliminated as an error source. Such gyro bias can be due to the effects of coning motion, misalignments and scale factor errors.

If there is coning and the gimbal is not counter-rotated, the platform can be slowly carrouseled. The outputs of the sensing axes that are perpendicular to the spin axis of the vehicle are averaged. The averaged output of each such perpendicular output axis is the drift rate of that axis.

If there is no coning and the gimbal is not counter-rotated, the outputs of the sensing axes that are perpendicular to the spin axis of the vehicle are equal to the drift rates of these axes.

SUMMARY OF THE INVENTION

A gyro platform assembly for a spinning vehicle comprising a gimbal, the gimbal being rotatable in a case means around a first rotational axis, a platform rotatably attached within the gimbal, the platform being rotatable around a second rotational axis, the second rotational axis being perpendicular to the first rotational axis, gyros located on the platform, each gyro having a sensing axis, the gyros being arranged to have mutually orthogonal sensing axes, one of the sensing axes being along the second rotational axis, and means for determining the outputs of the sensing axes.

DESCRIPTION OF THE PREFERRED EMBODIMENT

Figure 1:
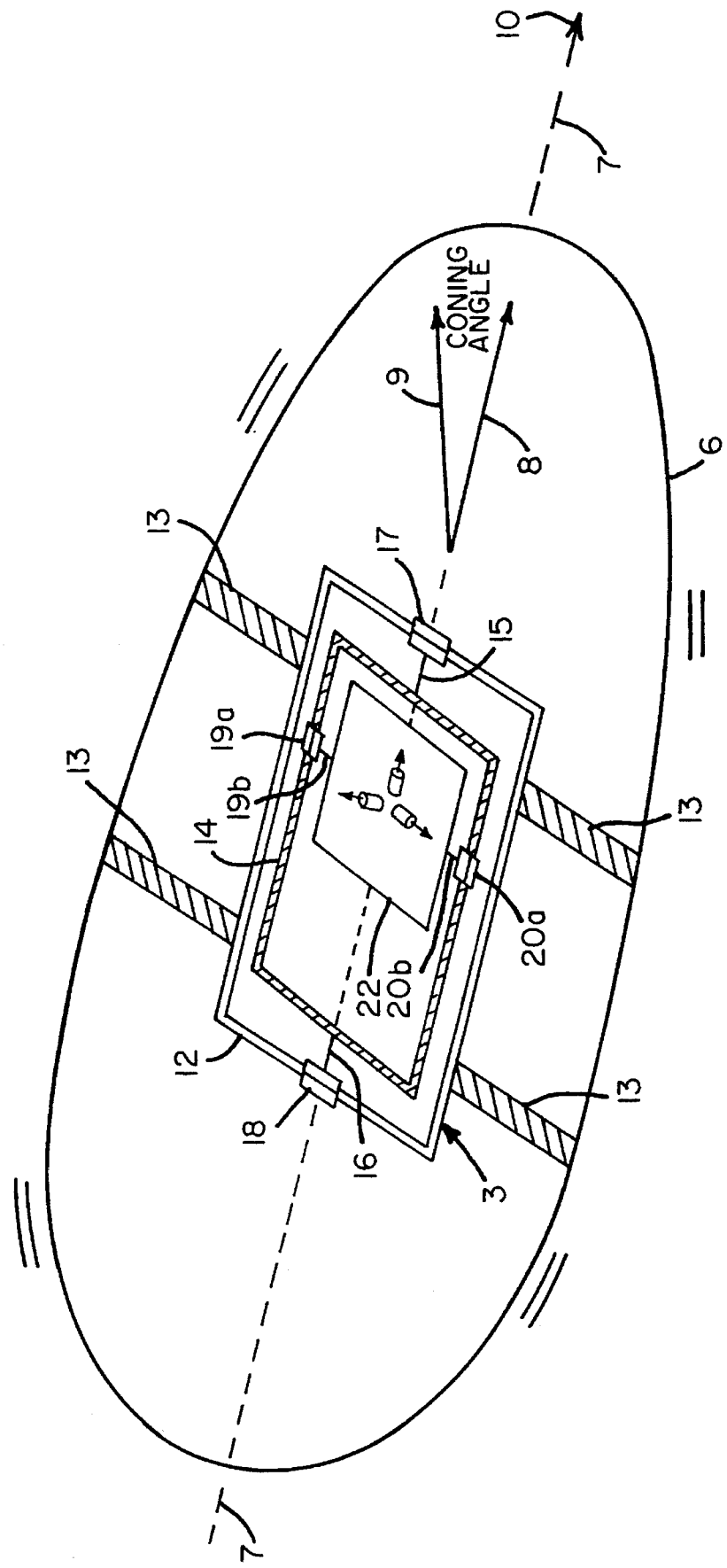
FIG. 1 is a perspective view of a gyro platform assembly that is attached to a spinning vehicle.

FIG. 1 shows a gyro platform assembly 3. The gyro platform assembly 3 is within vehicle 6.

The vehicle 6 may spin around an axis of vehicle 6. The axis of spin of vehicle 6 is called the spin axis 8. The spin axis 8 lies along a spin vector. For an ellipsoidal shaped vehicle such as vehicle 6 the spin axis 8 might be along the roll axis 7 of vehicle 6. The spin may be clockwise around roll axis 7 of vehicle 6, looking at vehicle 6 from the right edge of FIG. 1.

The vehicle thus has a spin axis 8. The spin axis 8 of vehicle 6 may or may not be coning in space, such as coning around a coning axis 9. The vehicle 6 has an angular momentum vector 10 along which vehicle 6 spins, or around which vehicle 6 spins and cones.

The gyro platform assembly has a case means 12, such as a frame. The case means 12 is attached to vehicle 6. The case means 12 acts as a casing for the gyro platform assembly 3. The case means 12 could be movably attaches in vehicle 6 so as to align a first rotational axis, of a gimbal 14 of the the assembly 3, along the spin axis 8. However in FIG. 1 braces 13 are used for fixed attachment of case means 12 to vehicle 6, with the first rotational axis being along the spin axis. The frame functions as a casing of the gyro platform assembly 3.

Gimbal 14 is rotationally attached within the case means 12. The gimbal 14 is attached to the case means 12 by means of gimbal axle 15 and gimbal axle 16. Gimbal axles 15 and 16 lie along the first rotational axis. The first rotational axis is made to be along the spin axis 8 and spin vector of vehicle 6. The spin axis 8 is along the spin vector of vehicle 6.

Resolver 17 is attached between the gimbal axle 15 and the case means 12. Torquer 18 is attached between the gimbal axle 16 and the case means 12. Torquer 18 is used to counter-rotate gimbal 14 around the first rotational axis, that is along the spin axis 8. The rotational direction of the gimbal is opposite to the angular direction of spin of the spinning vehicle 6, in order to keep gimbal 14 fixed in inertial space, that is, fixed with respect to the stars.

A torquer 19a and resolver 20a are attached to gimbal 14 and the torquer 19a and resolver 20a lie along a second rotational axis. The second rotational axis is in a direction that is perpendicular to the first rotational axis. Gimbal axles 19b and 20b are respectively attached between torquer 19a and resolver 20a and a platform 22. Gimbal axels 19b and 20b lie along the second rotational axis. Platform 22 can be rotated by torquer 19a around the second rotational axis. However in FIG. 1 platform is not shown as being rotated by torquer 19a around the second rotational axis.

Figure 2:
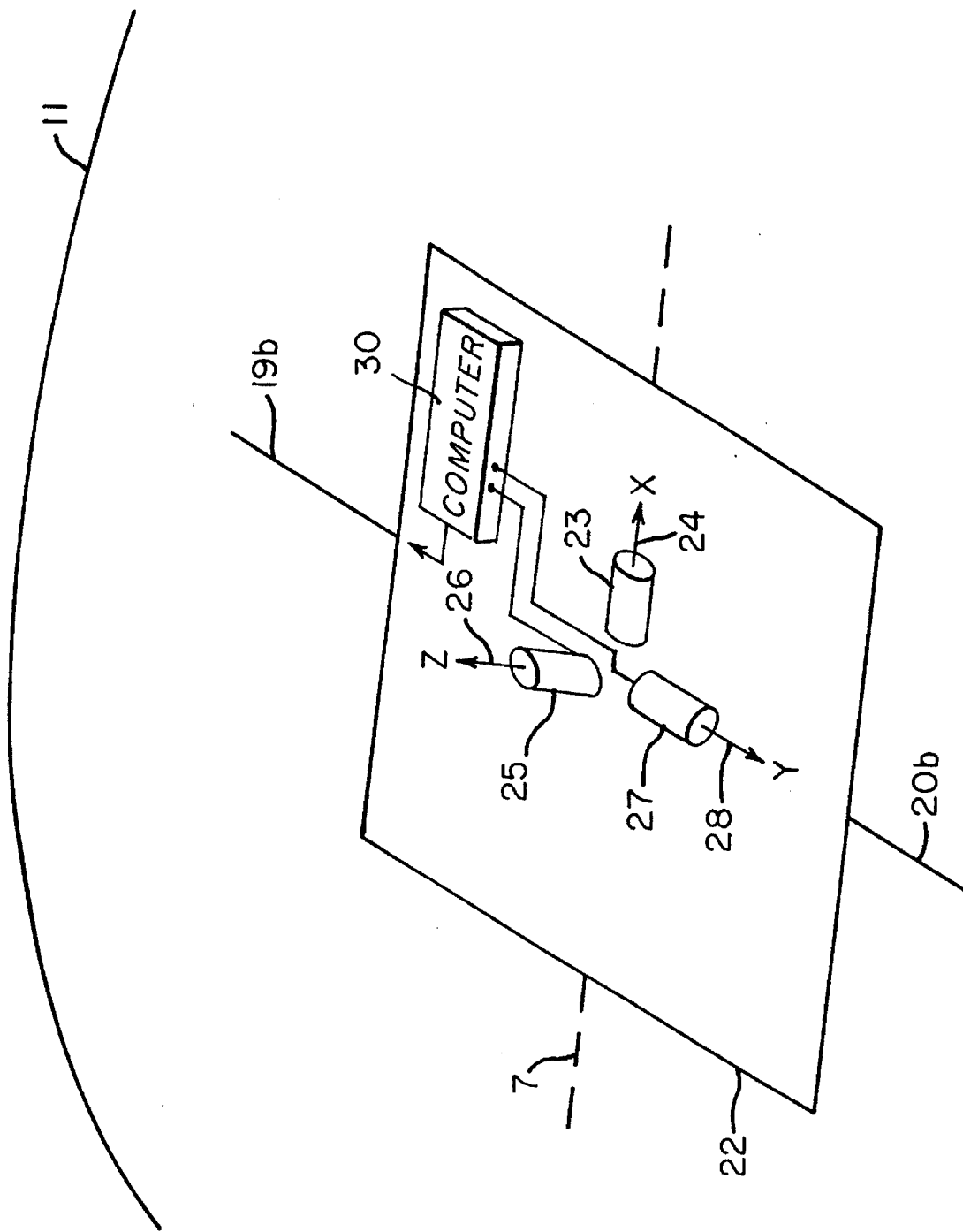
FIG. 2 is a perspective view of gyros located on the platform of the gyro platform assembly of FIG. 1.

As shown in FIG. 2, a first rate-gyro 23 is located on platform 22. The first rate-gyro 23 has a gyro sensing axis 24. The gyro 23 produces a signal S0. Signal S0 is proportional to a rate of rotation dR0/dt of the body of gyro 23 around sensing axis 24. S0 is also proportional to the drift rate dD0/dt of sensing axis 24. S0 equals k(dR0/dt+dD0/dt).

A second rate-gyro 25 is located on platform 22. The second rate-gyro 25 has a gyro sensing axis 26. The sensing axis 26 is perpendicular to the sensing axis 24 on platform 22. The gyro 25 produces a signal S1. Signal S1 is proportional to a rate of rotation dR1/dt of the body of gyro 25 around sensing axis 26. S1 is also proportional to the drift rate dD1/dt of sensing axis 26. S1 equals k(dR1/dt+dD1/dt).

A third rate-gyro 27 is located on platform 22. The third rate-gyro 27 has a gyro sensing axis 28. The third gyro sensing axis 28 is perpendicular to the first gyro sensing axis 24 and second gyro sensing axis 26 on platform 22. The gyro sensing axis 28 is along the second rotational axis referred to above. The gyro 27 produces a signal S2. Signal S2 is proportional to a rate of rotation dR2/dt of the body of gyro 27 around sensing axis 28. S2 is also proportional to the drift rate dD2/dt of sensing axis 28. S2 equals k(dR2/dt+dD2/dt).

A gyro platform assembly 3 is thus located on spinning vehicle 6.

I. Vehicle Spinning But No Coning Case

In order to find drift rate of the gyros, gimbal 14 is fixed in enertial space by counter-rotating gimbal 14 with respect to spin axis 8 of vehicle 6. The rate of rotation of gimbal 14 is made to be equal to the rate of spin of vehicle 6. The direction of rotation of gimbal 14 is made to be opposite to the direction of spin of vehicle 6. If there were no coning but only spin of vehicle 6, there is no rotation of gyro 23 with respect to fixed inertial space. dR0/dt would be equal to 0. Then S0 would be equal to dD0/dt. Thus if there is no coning, the drift rate of sensing axis 24 can be determined by measuring S0. If there were no coning but only spin rotation of vehicle 6 and counter-rotation of gimbal 14, there is no rotation of gyro 25 with respect to fixed inertial space. dR1/dt would be equal to 0. Then S1 would be equal to dD1/dt. Thus if there is no coning, the drift rate of sensing axis 26 can be determined by measuring S1. If there were no coning but only spin rotation of vehicle 6 and counter-rotation of gimbal 14, there is no rotation of gyro 27 with respect to fixed inertial space. dR2/dt would be equal to 0. Then S2 would be equal to dD2/dt. Thus if there is no coning, the drift rate of sensing axis 28 can be determined by measuring S2.

In the absence of external torques, the angular momentum vector 10 of the spinning vehicle 6 remains fixed in inertial space. The magnitude and direction of the angular momentum vector 10 are constant. Of interest to this invention is the fact that the direction of the angular momentum vector 10 remains fixed. The angular momentum vector 10 includes two components, which are the vehicle spin axis 8 and the coning axis 9.

Further, if known torques act on the spinning vehicle, then the change in direction of the angular momentum vector 10 is known and is still a useful angular rate reference.

Again, for simplicity in understanding how the inertial platform functions to maintain accuracy, the following description assumes that the direction of angular momentum vector 10 with respect to inertial space is fixed and there is no coning motion of vehicle 6 in space. Vehicle 6 is spinning with angular velocity dR3/dt. However, the description could be extended to include the effects of known torques and coning motion on vehicle 6.

The gyro platform assembly 3 is illustrated in the FIG. 1. The outer gimbal axles 15 and 16 are aligned in the direction of the spin axis 8 of vehicle 6. Vehicle 6 is spinning clockwise looking toward its right end from the right side of FIG. 1. The spin axis 8 is along roll axis 7 of vehicle 6. The inner gimbal axles 19 and 20 are perpendicular to the outer gimbal axles 15 and 16. Platform 22 is in the plane of gimbal 14. The gyros, with input sensing axes 24, 26 and 28, are located on the platform 22. The gyro sensing axis 28 is aligned with the gimbal axles 19b and 20b. The gyro sensing axes 24 and 26 are orthogonal to each other and both are perpendicular to the gyro sensing axis 28. For the orientation of the platform 22 shown in FIG. 1 the gyro sensing axis 24 is aligned with the outer gimbal axles 15 and 16 and the direction of the vehicle spin vector 8.

The rate of rotation of gimbal 14 is held equal to the rate of spin, dR3/dt, of vehicle 6. The direction of rotation of gimbal 14 is made to be opposite to the direction of spin of vehicle 6. The gimbal 14 is rotated by torquer 18. Therefore in the situation of no coning, dR0/dt, dR1/dt and dR2/dt each equal zero. Therefore, dD0/dt equals S0, dD1/dt equals S1 and dD2/dt equals S2. Thus the drift rate dD0/dt of sensing axis 24, drift rate dR1/dt of sensing axis 26 and drift rate dR2/dt of sensing axis 28 are determinable and are equal to S0, S1 and S2 respectively.

II. Vehicle Spinning and Coning Case

If there is coning, as well as spinning of vehicle 6, the following methods can be used to find the drift rates of the gyros of the assembly 3 of FIG. 1:

(a) The gimbal 14 is counter-rotated at the spin rate within spinning vehicle 6. Platform 22 of FIG. 1 is continuously or periodically rotated around 360 degrees. This latter rotation of platform 22 averages out the effect of coning on input axes 24 and 26. That is, dR0/dt averages to zero, as does dR1/dt. The average values of S0 and S1 are the drift rates of gyro sensing axes 24 and 26, respectively. The gyro drift rate factor for each of gyro 23 and 25 can be eliminated, or significantly minimized, as a contribution to the inertial attitude reference accuracy.

(b) Gimbal 14 is counter-rotated at the spin rate within spinning vehicle 6. Gimbal 14 of FIG. 1 is also continuously or periodically rotated around 360 degrees with respect to fixed space. This latter rotation of gimbal 14 averages out the effect of coning on sensing axes 26 and 28. That is, dR1/dt averages to zero as does dR2/dt. The average values of S1 and S2 are the drift rates of gyro sensing axes 26 and 28, respectively. The gyro drift rate factor for each gyro 25 and 27 can be eliminated, or significantly minimized, as a contribution to the inertial attitude reference accuracy. Then, platform 22 is rotated 90 degrees with respect to the space fixed position shown in FIG. 1. Gimbal 14 is once again continuously or periodically rotated 360 degrees. This averages out the effect of coning on imput axes 24 and 28. That is, dR0/dt averages to zero, as does dR2/dt. The output values of S0 and S2 are the drift rates of gyros 23 and 27, respectively. The gyro drift rate factor for each of gyros 23 and 27 can be eliminated, or significantly minimized, as a contribution to the inertial attitude reference accuracy.

Gyros 23, 25, and 27 can be maintained along fixed gyro axes in space even though the vehicle 10 spins on axis 8. The gyros are so maintained in space by means of a servo system. The resolver 17 and torquer 18 are part of the servo system. The resolver 17 detected the amount of spin of vehicle 6 and sends the information to the torquer 18. Torquer 18 puts a sufficient amount of torque on gimbal 14 in order to maintain gyros 23, 25 and 27 fixed in inertial space by counter-rotating gimbal 14.

(c) As shown in FIG. 1, platform 22 is fixed as coplanar with respect to gimbal 14. The gimbal 14 is not counter-rotating in spinning vehicle 6. Thus gimbal 14 is thus spinning in fixed space clockwise around roll axis 7 at a constant spin rate. Gyro axes 26 and 28 output signals S1 and S2. The values, or amplitudes, of the signals are constant. The amplitudes of the signals S1 and S2 are proportional to the amounts of gyro drift rates of sensing axes 26 and 28. These signals are transformed by the outer gimbal axis resolver, or by the inertial platform computer 30. The transformed rate signals are sine waves whose amplitudes A1 and A2 are directly proportional to the constant gyro drift rates dD1/dt and dD2/dt and inversely proportional to the angular rate of coning rotation W of platform 14 in fixed space.

The angular rate of coning rotation W in fixed space of gimbal 14 is observed from the signal time history. The transformed signals, S'1 and S'2, vary as sine [(W)(t)]. The gyro drift rates dD1/dt and dD2/dt for sensing axes 26 and 28 can then be determined. If the output rate signal is integrated, then an amplitude of the sine wave is obtained. That is, the drift angles of sensing axes 26 and 28 can be determined. The frequency of spin rotation frequency of vehicle 6 must be different than the coning motion frequency so that these two signals S1 and S2 can be observed.

The value of the signal S1 is proportional to the value of the centrifugal force F1 on the rotor of gyro 25. F1=(K1)(S1). The coefficient K1 between S1 and F1 may be experimentally determined by calibrating gyro 25. The formula for centrifugal force F1 is F1 = (M1)(L1)(Wsquared) (sine D1). M1 is the mass of the rotor of gyro 25. The value of M1 is known. L1 is the distance of the rotor of gyro 25 from the axis of rotation 7. The value of L1 is known. W is the rate of coning rotation of vehicle 10. Further D1 is the drift angle of the rotor. Thus (sine D1)= (K1) (S1) / (M1) (L1) (Wsquared) .

The value of the signal S2 is proportional to the value of the centrifugal force F2 on the rotor of gyro 27. F2=(K2)(S2). The coefficient K2 between S2 and F2 may be experimentally determined by calibrating gyro 27. The formula for centrifugal force F2 is F2=(M2) (L2)(Wsquared) (sine D2). M2 is the mass of the rotor of gyro 27. The value of M2 is known. L2 is the distance of the rotor of gyro 27 from the axis of rotation 7. The value of L2 is known. W is the rate of coning rotation of vehicle 6. Further D2 is the drift angle of the rotor. Thus (sine D2)=(K2) (S2)/(M2) (L2) (Wsquared).

Gimbal 14 is not counter-rotating. By comparing measurements from two opposite orientations of a gyro input axis 24, having a 180 degree difference, the gyro drift bias of gyro axis 24, also known as the gyro drift rate, is determined. This is done by rotating platform 22 180 degrees from the position shown in FIG. 1. The determined gyro bias is significantly eliminated as an error source after the gyro drift bias, or gyro drift rate, is determined.

(d) Gimbal 14 is not counter-rotated at the spin rate within vehicle 6. Gimbal 14 of FIG. 1 is continuously rotated at the coning rate around the first rotational axis, The gimbal 14 is thus rotated around 360 degrees with respect to fixed space.

This rotation of gimbal 14 averages out the effect of coning on axes 26 and 28. That is, dR1/dt averages to zero as does dR2/dt. The average values of S1 and S2 are the drift rates of gyro axes 26 and 28, respectively. The gyro drift rate factor for each gyro 25 and 27 can be eliminated, or significantly minimized, as a contribution to the inertial attitude reference accuracy.

Then platform 22 is rotated 90 degrees with respect to the space fixed position shown in FIG. 1. Gimbal 14 is again continuously rotates at the coning rate around the first rotational axis. This averages out the effect of coning on imput axes 24 and 28. That is, dR0/dt averages to zero, as does dR2/dt. The average values of S0 and S2 are the drift rates of gyros 23 and 27, respectively. The gyro drift rate factor for each of gyros 23 and 27 can be eliminated, or significantly minimized, as a contribution to the inertial attitude reference accuracy.

While the present invention has been disclosed in connection with the preferred embodiment thereof, it is understood that there may be other embodiments which fall within the spirit and scope of the invention as defined by the following claims.

What is claimed is:

1. A gyro platform assembly for determining a coning rate of a spinning vehicle, comprising:

(a) a gimbal, the gimbal being rotatable in a case means around a first rotational axis, the first rotational axis being along a spin axis of the spinning vehicle;

(b) a platform rotatably attached within the gimbal, the platform being rotatable around a second rotational axis, the second rotational axis being perpendicular to the first rotational axis;

(c) three gyros located on the platform, each gyro having a sensing axis, the gyros being arranged to have mutually orthogonal sensing axes, one of the sensing axes being along the second rotational axis and another sensing axis placed in line with the spin axis of the vehicle;

(d) means for determining the outputs of the sensing axes; and (e) commuter means for processing the output of a sensing axis that is orthogonal to the spin axis of the vehicle, an output of the computer means having a value equal to a sine of a coning rate of the vehicle.

2. A gyro platform assembly for determining a coning rate of a spinning vehicle, comprising:

(a) a gimbal, the gimbal being rotatable within a case means around a first rotational axis, the first rotational axis being along a spin axis of the vehicle;

(b) a platform rotatably attached within the gimbal, the platform being rotatable around a second rotational axis, the second rotational axis being perpendicular to the first rotational axis;

(c) means for rotating the platform;

(d) three gyros located on the platform, each gyro having a sensing axis, the gyros being arranged to have mutually orthogonal sensing axes, one of the sensing axes being along the second rotational axis and another sensing axis placed in line with the spin axis of the vehicle;

(e) means for determining the outputs of the sensing axes; and (f) computer means for processing the output of a sensing axis that is orthogonal to a spin axis of the vehicle, an output of the computer means having a value equal to a sine of a coning rate of the vehicle.

3. A gyro platform assembly for determining a coning rate of a spinning vehicle, comprising:

(a) a gimbal being rotatable within a case means around a first rotational axis, the first rotational axis being along a spin axis of the spinning vehicle;

(b) means for rotating the gimbal around the first rotational axis;

(c) a platform rotatably attached within the gimbal, the platform being rotatable around a second rotational axis, the second rotational axis being perpendicular to the first rotational axis;

(d) means for rotating the platform around the second rotational axis;

(e) three gyros located on the platform, each gyro having a sensing axis, the gyros being arranged to have mutually orthogonal sensing axes, one of the sensing axes being along the second rotational axis and another sensing axis placed in line with the spin axis of the vehicle;

(f) means for determining the outputs of the sensing axes; and (g) computer means for processing the output of a sensing axis that is orthogonal to the spin axis of the vehicle, an output of the computer means having a value equal to a sine of a coning rate of the vehicle.

4. A gyro platform assembly for determining a coning rate of a spinning vehicle, comprising:

(a) a gimbal rotatably attached to a spinning vehicle, the gimbal being rotatable around a first rotational axis, the first rotational axis being along a spin axis of the spinning vehicle;

(b) means for rotating the gimbal around the first rotational axis in an angular direction opposite to the direction of spin of the spinning vehicle and at an angular rate equal to the rate of spin of the spinning vehicle in order to keep the gimbal fixed in inertial space;

(c) a platform rotatably attached within the gimbal, the platform being rotatable around a second gimbal axis, the second gimbal axis being perpendicular to the first gimbal axis;

(d) means for rotating the platform;

(e) three gyros located on the platform, each gyro having a sensing axis, the gyros being arranged to have mutually orthogonal sensing axes, one of the sensing axes being parallel to the second gimbal axis and another sensing axis being placed in line with the spin axis of the vehicle;

(f) means for determining the outputs of the sensing axes; and (g) computer means for processing the output of a sensing axis that is orthogonal to the spin axis of the vehicle, an output of the computer means having a value equal to a sine of a coning rate of the vehicle.

5. A gyro platform assembly for determining a coning rate of a spinning vehicle, comprising:

(a) case means for holding a gimbal, the case means being attached to the spinning vehicle;

(b) a gimbal rotatably attached to the case means, the gimbal being rotatable around a first rotational axis, the first rotational axis being along a spin axis of the spinning vehicle;

(c) means attached to the gimbal for rotating the gimbal in an angular direction opposite to a direction of the spinning vehicle and at an angular rate equal to the rate of spin of the spinning vehicle in order to keep the gimbal fixed in inertial space;

(d) a platform rotatably attached within the gimbal, the platform being rotatable around a second rotational axis, the second rotational axis being perpendicular to the first rotational axis;

(e) means for rotating the platform;

(f) three gyros located on the platform, each gyro having a sensing axis, the gyros being arranged to have mutually orthogonal sensing axes, one of the sensing axes being along the second rotational axis and another sensing axis placed in line with the spin axis of the vehicle;

(g) means for determining the outputs of the sensing axes; and (h) computer means for processing the output of a sensing axis that is orthogonal to the spin axis of the vehicle, an output of the computer means having a value equal to a sine of a coning rate of the vehicle.

6. The gyro platform assembly of claim 1 wherein accelerometer means for navigational sensing is located on the platform.

* * * * *